Feb. 28, 1950

T. M. BERRY ET AL

2,499,178

CURVE FOLLOWER

Filed Nov. 18, 1948

Inventors:
Theodore M. Berry,
Howard L. Clark,
by Their Attorney.

Patented Feb. 28, 1950

2,499,178

UNITED STATES PATENT OFFICE 2,499,178

CURVE FOLLOWER

Theodore M. Berry, Schenectady, and Howard L. Clark, Ballston Lake, N. Y., assignors to General Electric Company, a corporation of New York Application November 18, 1948, Serial No. 60,698

8 Claims. (Cl. 318—162)

This invention relates to control systems, more particularly to curve follower control systems, and it has for an object the provision of a simple, reliable and improved control system of this character.

A further object of the invention is the provision of a control system which will control the curve follower to follow automatically around any given curve in the form of a line on a drawing.

Still another object of the invention is the provision of a curve follower in which a photoelectric scanning head follows the path of a completely closed curve and simultaneously controls a machine tool, such as a milling machine, to cut a workpiece to the same shape as the curve which is being followed.

It is also an object of the invention to maintain a perpendicular relationship between a center of rotation of the scanning head and the curve so that by maintaining the center of rotation at a constant perpendicular distance from the curve equal to or having a predetermined relationship to the radius of a rotary cutting tool, accurate reproduction of the curve is made possible.

In illustrating the invention in one form it is shown as embodied in a contour milling control system for cutting turbine blade masters. As the curve follower moves along the curve, its position is transmitted electrically through power Selsyns to the worktable of a milling machine. As the follower moves around the curve, the milling machine cuts out the same shape on the blade. The drawings are closed loops of air foil sections, each representing a cross section of the blade at a specific level between the root and the tip. Successive cuts are made from the tip to the root of the blade using drawings of proper air foil sections until the blade is complete.

In carrying the invention into effect in one form thereof, there is provided a source of reference alternating voltage and a pair of triode electric valves supplied from the source, the connections being such that the anode of one valve is positive when the anode of the other is negative. There is also provided a support for a drawing having a curved line thereon. The optical axis of a photoelectric scanning device is perpendicular to and intersects the plane of the drawing. In response to the condition of intersection of the optical axis with the curve which is being followed, the scanning device causes voltage impulses to be supplied to the grids of the electric valves in phase with the anode voltages which causes both valves to conduct equal amounts. If the optical axis intersects the plane of the drawing on one side of the curved line, the scanning device causes phase advanced voltage impulses to be supplied to one of the grids and phase retarded voltage impulses to the other grid to effect unequal conduction of the valves. Driving means are provided for effecting a component of relative motion of the support and the scanning device perpendicular to the curved line and a second component of relative motion tangent to the curved line. The driving means does not produce any component of motion perpendicular to the curved line in response to the condition of equal conduction of the valves. In response to the condition of unequal conduction of the valves, the driving means effects a component of relative motion of the support and scanning device which is perpendicular to the curved line.

The scanning device is mounted on an arm for rotation about an axis which is perpendicular to the plane of the drawing. If the line joining the intersections of the optical axis and the axis of rotation of the scanning device arm is perpendicular to the curve being followed, the scanning device supplies voltage impulses which are in phase with the anode voltages causing both valves to conduct equally and to have a predetermined total conduction. If the line joining the intersections of these axes with the plane of the drawing is not perpendicular to the curved line, the scanning device causes either phase advanced or phase retarded voltage impulses to be supplied to both grids to increase or decrease the total conduction of both valves. Another driving means responds either to an increase or a decrease in the total conduction of both valves to rotate the arm in a direction to restore the perpendicular relationship of the curved line and the line joining the intersections of optical axis and the axis of rotation.

For a better and more complete understanding of the invention reference should now be had to the following specification and to the accompanying drawing, of which

Figures 1, 2, 2A, 3, 6:
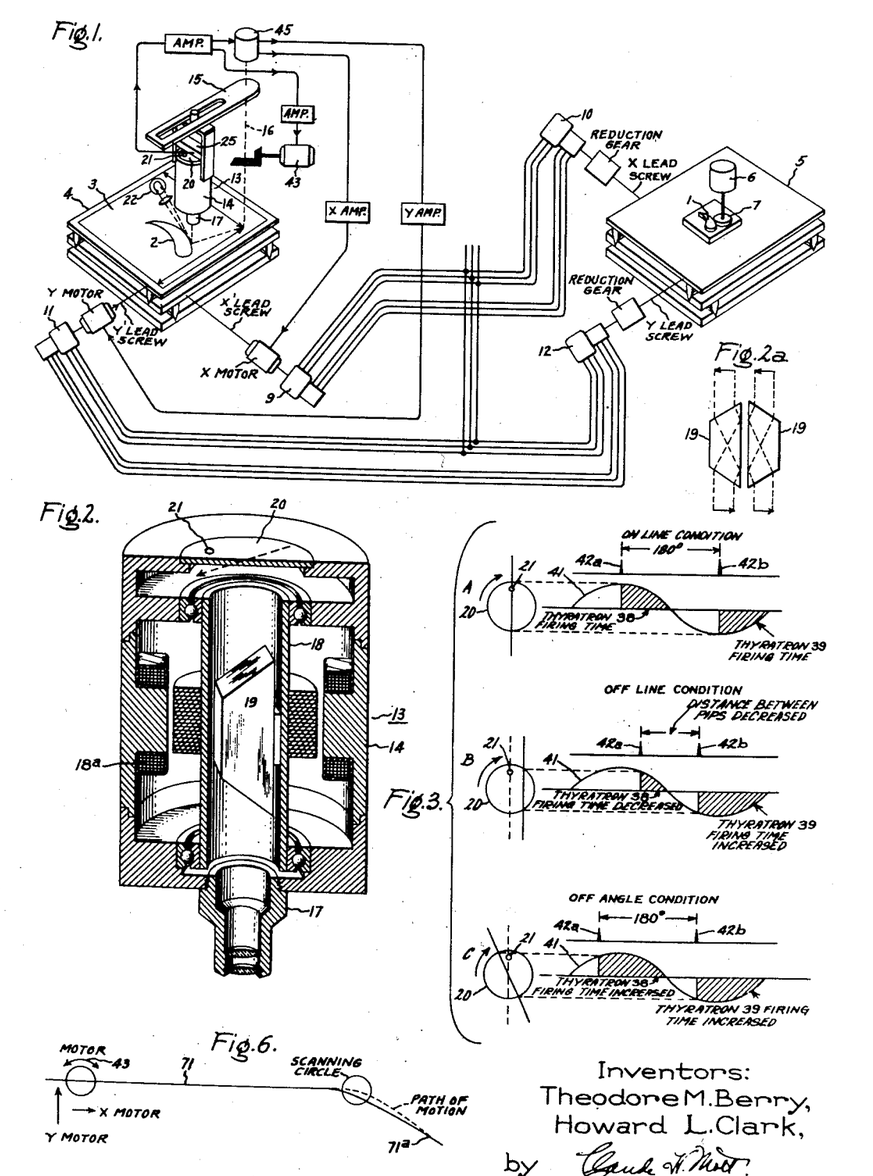
Fig. 1 is a simple schematic illustration of an embodiment of the invention in block diagram form.
Fig. 2 is a detail viewed in perspective.
Fig. 2a is a diagrammatic sketch illustrating the operation of the detail of Fig. 2.
Fig. 3 is a chart of characteristic curves which facilitate an understanding of the operation of the invention.
Fig. 6 is a sketch in diagram form illustrating the path of the scanning head in following around a curvature.

Referring now to the drawing, a workpiece 1 is to be milled to the shape of a turbine blade. It is in the process of having a cut taken which is in the shape of a curve 2 on a drawing 3 which is mounted on a support 4.

The workpiece 1 is mounted on the worktable 5 of a milling machine. An electric motor 6 drives the spindle which at its lower end carries the milling cutter 7. Preferably the milling cutter is stationary, i. e. it has no motion in a longitudinal or transverse direction although it does have a rotary motion about the axis of the spindle. Longitudinal motion is imparted to the table 5 by means of a lead screw which on the drawing is denoted "$x$ lead screw," and transverse motion is imparted to the table by a lead screw which is denoted "$y$ lead screw." It will be understood that the table 5 may be held stationary and that longitudinal and transverse motions may be imparted to the head (not shown) which supports the milling cutter.

The $x$ lead screw is driven by suitable driving means illustrated in the drawing as an electric motor designated "$x$ motor" through a suitable motion transmitting system illustrated as a power Selsyn system comprising a Selsyn transmitter 9 driven by the $x$ motor and a Selsyn receiver 10 which is electrically connected to the transmitter and mechanically connected to the $x$ lead screw of the milling machine. Similarly, the $y$ lead screw is driven by means of an electric motor designated "$y$ motor" through a power Selsyn system comprising the Selsyn transmitter 11 and the Selsyn receiver 12.

The $x$ and $y$ motors are controlled by means of a photoelectric control system which comprises a photoelectric scanning device 13 and a number of amplifiers controlled thereby. As illustrated in Figs. 1 and 2, the photoelectric scanning device comprises a tubular supporting and enclosing member 14 which is mounted in a desired position on the slotted arm 15 for rotation about the axis of a spindle 16.

At its lower end the tubular member 14 is provided with a lens supporting barrel 17 which supports a suitable lens system which is illustrated conventionally in Fig. 2. An inner tubular member 18 which is coaxial with the outer member 14 is journaled in suitable bearings for rotation with respect to the outer member about the longitudinal axis. Midway of its length, the outer tubular member 14 supports the stator windings 18a of a synchronous motor and the inner tubular member carries the rotor punchings 18b of a synchronous motor. The inner tubular member thus constitutes a hollow motor shaft. Mounted within the hollow shaft of the rotor member and in the optical axis of the lens system is a dove prism 19. The prism is so shaped that light passes through the lenses in the general direction of the optical axis. Light which enters the prism at the bottom surface will be refracted and reflected in the manner indicated in Fig. 2a and will then leave the prism at the top surface in the general direction of the optical axis. The purpose of the prism is to rotate the image of that portion of the curved line 2 which is within the field of the lens, as the prism itself is rotated. Actually the image rotates at twice the speed of rotation of the prism. This action of the prism is illustrated diagrammatically in Fig. 2a.

Above the prism, i. e. at the upper end of the tubular supporting member 14, is a disc 20. It contains a small circular aperture 21 which is off center with respect to the optical axis by a small amount, e. g. .160 inch. This off center distance of .160 inch on the disc 21 corresponds to an off center distance of .02 inch on the plane of the drawing owing to the magnification of the lens system.

The drawing 3 is preferably flat white and the curve line is black approximately .010 inch wide. The portion of the drawing which is within the field of the lens system is illuminated by means of a lamp 22.

Figure 4:
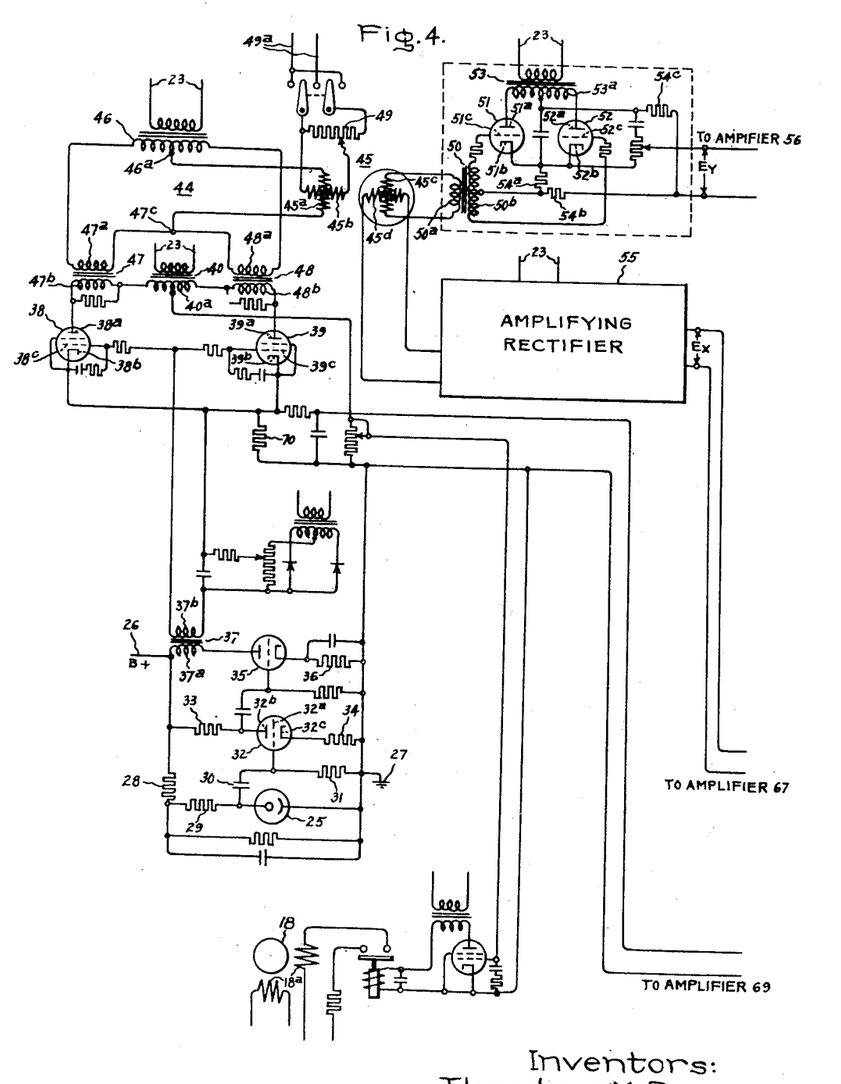
Fig. 4 is a simple schematic diagram of the control system utilized in the invention minus the power amplifiers and the motors supplied therefrom.

Alternating voltage is supplied to the stator winding of the synchronous motor from a suitable source such as supply conductors 23 in Fig. 4. Preferably the speed of the synchronous motor is 1800 revolutions per minute and since the prism is mounted directly on the rotor it is rotated at the same speed. Consequently the image of that portion of the curved line within the field of the lens is rotated at 3600 R. P. M., i. e. once for each cycle of the alternating voltage.

With a ground glass above the aperture one sees the image of an end of the portion of the line in the optical field pass twice for each complete revolution of the image of that portion, i. e. once for each half cycle of the alternating voltage.

Directly above the aperture 21 is a photoelectric cell 25 for changing the light variations produced by each passage of the image of the line past the aperture 21. As shown in Fig. 4, the photoelectric cell is supplied from a suitable source of direct voltage represented by the positive supply line 26 and the negative supply line represented by the ground 27. Two resistors 28 and 29 are included in circuit with the photoelectric cell.

By means of a coupling comprising a capacitor 30 and a resistor 31, the photoelectric cell circuit is coupled to the grid 32a of a first stage amplifier valve 32 of which the anode 32b is connected through a resistor 33 to the positive supply conductor and the cathode 32c is connected through a resistor 34 to ground. The first stage is similarly coupled to the input circuit of a second stage which includes an electric valve 35. A resistor 36 is connected in the cathode circuit of valve 35 and the primary winding 37a of a coupling transformer 37 is connected in the anode circuit. The secondary winding 37b of the transformer is connected in the input circuit of a pair of electric valves 38 and 39 which are preferably thyratrons. These thyratrons are provided with anodes 38a and 39a, cathodes 38b and 39b and control grids 38c and 39c, respectively. Both grids 38c and 39c are connected to the same terminal of the secondary winding. Alternating voltage is supplied to the anodes 38a and 39a from a suitable source such as the source 23 to which they are connected through a transformer 40. As shown in Fig. 4, the anodes 38a and 39a are connected to opposite terminals of the secondary winding 40a and thus the voltages supplied to the anodes are in phase opposition.

Since the stator windings 18a of the synchronous motor which rotates the prism 19 and the anodes 38a and 39a are supplied from the same source, the voltage impulses produced in the photoelectric cell circuit by the passage of the image of the line past the aperture 21 are synchronized with the anode voltages of the thyratrons. This is illustrated in Fig. 3A of the drawing in which the sinusoidal curve 41 represents the alternating voltage which is supplied to the anodes 38a and 39a. The first half cycle of the curve 41 represents the positive half cycle of voltage supplied to the anode 38a and the second half cycle represents the negative half cycle. Since the voltages supplied to the anodes are in phase opposition, the negative half cycle of curve 41 may also be considered as the positive half cycle of the voltage supplied to the anode 39a. The voltage impulse produced by the photoelectric cell in response to the passage of one end of the image is represented by the voltage peak 42a and the voltage impulse produced by the passage of the other end of the image is represented by the peak 42b. Each peak is amplified and supplied to both grids 38c and 39c. The peak 42a is received on the grid 38c when the anode voltage of thyratron 38 is positive and on the grid 39c when the anode voltage of thyratron 39 is negative. Consequently the peak 42a fires the thyratron 38. Similarly the peak 42b is received on the grid 38c when the anode voltage is negative and on the grid 39c when the anode voltage is positive, thereby to fire thyratron 39. This action is repeated each cycle of the alternating voltage provided the line which joins the optical axis of the scanner and the axis of the spindle 16 is perpendicular to the curve 2.

When the scanning head is in a position directly above the curved line 2 so that the lens barrel is centered on the curved line and the optical axis of the scanner intersects the line, the voltage peaks 42a, 42b, etc. are in phase with the anode voltages. That is to say, the voltage peak 42a occurs at the 90 degree phase point of the positive half cycle of voltage of anode 38a and the voltage peak 42b occurs at the 90 degree phase point of the voltage of anode 39a. Consequently each thyratron conducts during the last half of the positive half cycle of its anode voltage.

If the scanning head is displaced to one side of the curved line, e. g. to the left, as illustrated in Fig. 3B, the lower end of the image is late in arriving under the aperture 21 and the upper end is early. Consequently the phase of the voltage peak 42a is retarded and that of the voltage peak 42b is correspondingly advanced. This results in decreasing the conduction of thyratron 38 and increasing the conduction of thyratron 39. The opposite condition results if the scanning head becomes displaced to the right of the curved line, i. e. the conduction of thyratron 38 is increased and the conduction of thyratron 39 is decreased.

The direction of the arm 15 upon which the scanning head is mounted is the same as the direction of the line which joins the optical axis and the axis of rotation of the spindle 16. Consequently the direction of the arm may be taken as the criterion of perpendicularity. If the arm 15 is perpendicular to the curved line and the lens barrel is centered on the line, the voltage peaks 42a and 42b are in phase with the thyratron anode voltages, as illustrated in Fig. 3A and a predetermined total amount of current is conducted by the two thyratrons. However, if the arm 15 is not perpendicular to the curved line and the lens barrel is centered on the line, the voltage peak 42a and 42b are in phase with the thyratron anode voltages, as illustrated in Fig. 3A and a predetermined total amount of current is conducted by the two thyratrons. However, if the arm 15 is not perpendicular to the curved line, even though the line is centered in the lens barrel, both voltage impulses will be phase advanced or phase retarded, depending upon the direction in which the arm is "off angle." As illustrated in Fig. 3C, the arm is off angle in such a direction that the voltage impulses 42a and 42b are phase advanced, with the result that the total conduction of both thyratrons is increased above the predetermined total current which flows when the arm is perpendicular to the curved line. If the arm is off angle in the opposite direction, both voltage impulses 42a and 42b are phase retarded and the total current conducted by both thyratrons is decreased below the predetermined total current which flows when the arm is perpendicular.

The currents conducted by the thyratrons 38 and 39 are utilized to control the $x$ motor and the $y$ motor to maintain the scanning head in a position in which the optical axis of the scanning head intersects the curved line, and the total current of the two thyratrons is utilized to control a motor 43 which is connected to rotate the spindle 16 and thus to rotate the arm 15 to a position in which it is perpendicular to the curved line. For controlling the $x$ motor and the $y$ motor in response to the currents conducted by the thyratron, an inductance bridge 44 and a Selsyn 45 controlled thereby are provided. Opposite halves of the secondary winding 46 of a transformer constitute two arms of the bridge and reactance windings 47a and 48a of two saturable reactors 47 and 48 constitute the two remaining arms of the bridge. In the anode circuit of thyratron 38 is connected the saturating winding 47b of saturable reactor 47 and similarly in the anode circuit of thyratron 39 is connected the saturating winding 48b of reactor 48.

Across the output terminals 46a and 47c of the bridge is connected one primary winding 45a of the Selsyn 45. Mounted in quadrature with the winding 45a is a second primary winding 45b which is connected to be supplied from a potentiometer 49 which in turn is supplied from a source of single phase alternating voltage such as is represented by the conductors 49a. The source 49a is preferably the same source as the source 23 from which the inductance bridge is supplied. Two secondary windings 45c and 45d are arranged in quadrature with each other and are mounted in inductive relationship with the primary windings. Preferably the stator windings 45a and 45b are the primary windings and the rotor windings 45c and 45d are secondary windings. However, the rotor windings may be utilized as primary windings and the stator windings may be utilized as secondary windings, if desired.

With both thyratrons 38 and 39 conducting equal amounts of current, both reactors 47 and 48 are equally saturated and the inductance bridge is balanced. In the balanced condition no voltage is applied to the primary winding 45a of the Selsyn. Unequal conduction of the thyratrons produces an unbalance of the bridge with the result that a voltage is applied to primary winding 45a. The phase of this primary voltage depends upon which of the two thyratrons is conducting the greater amount of current.

The currents flowing in the primary windings cause voltages to be induced in the secondary windings 45c and 45d. The voltage induced in the secondary winding 45c is rectified, amplified and utilized to control the speed and direction of rotation of the $y$ motor and the voltage induced in the secondary winding 45d is also rectified, amplified and utilized to control the speed and direction of rotation of the $x$ motor. As shown, the secondary winding 45c is connected to the primary winding 50a of a grid transformer 50 of which the secondary winding 50b is connected in the grid or input circuit of a phase sensitive amplifier which comprises a pair of electric valves 51 and 52. These valves are provided with anodes 51a and 52a, cathodes 51b and 52b and control grids 51c and 52c, respectively. Alternating voltage is supplied to the anodes from a suitable source, such as the source 23 to which they are connected through a transformer. One terminal of secondary winding 53a is connected to the anode 51a and the opposite terminal is connected to the anode 52a. One terminal of the secondary winding 50b of the grid transformer is connected to the grid 51c and the other terminal is connected to the grid 52c. Between the cathodes and a center tap of the secondary winding 53a is connected a voltage divider which comprises resistors 54a, 54b and 54c connected in series relationship. Across a selected portion of this divider appears a direct control voltage $E_y$ which varies in magnitude in accordance with the phase and magnitude of the input signal voltage. For example, when the input voltage supplied to the grids is maximum and is in phase with the anode voltage, the magnitude of $E_y$ is maximum. When the input voltage is maximum and 180° out of phase with the anode voltage, the magnitude of $E_y$ is minimum. When the input voltage is zero, the magnitude of $E_y$ is half way between its maximum and minimum voltages. In other words, for values of input voltage within the working range of the valves, the output voltage varies linearly with the input voltage.

The voltage induced in the secondary winding 45d is supplied to the input circuit of a phase sensitive amplifying rectifier 55 which is in all respects identical with the one just described. At its output terminals appears a direct control voltage $E_x$ which varies linearly with the input voltage.

Figure 5:
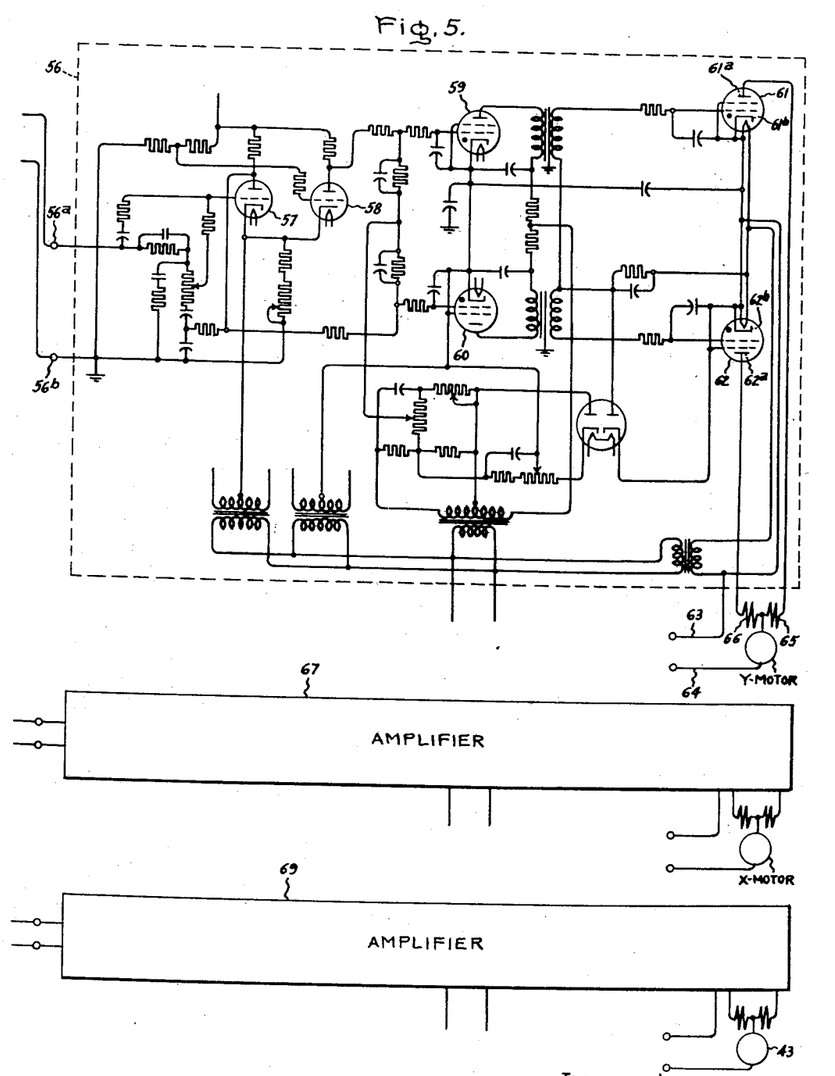
Fig. 5 is a simple schematic diagram of one of the power amplifiers.

The direct control voltage $E_y$ is supplied to the input terminals 56a and 56b of a three stage balanced power amplifier 56, as shown in Fig. 5. A balanced pair of electric valves 57 and 58 constitute the first stage of the amplifier; a balanced pair of thyratrons 59 and 60 constitute the second stage, and a balanced pair of thyratrons 61 and 62 constitute the third stage. Alternating voltage is supplied to the output circuits of the third stage thyratrons from a suitable source of voltage which is represented by the two supply conductors 63 and 64. The anode 61a of one of these thyratrons is connected through the split field winding 65 and armature of the y motor to the supply conductor 64 and the anode 62a of thyratron 62 is connected through the reverse split field winding 66 and armature to the conductor 64, whereas both cathodes 61b and 62b are connected to the supply conductor 63.

When the control voltage $E_y$ which is supplied to the input terminals 56a and 56b is maximum, the thyratron 61 will be fully conducting and the thyratron 62 will be non-conducting. The motor field 66 will be fully energized and the y motor will be running at full speed in one direction. Similarly when the voltage $E_y$ is minimum, the thyratron 62 will be fully conducting and the thyratron 61 will be non-conducting, and the y motor will be running at full speed in the opposite direction. For a value of $E_y$ half way between maximum and minimum, both thyratrons 61 and 62 will be conducting small and equal amounts of current. The field windings 65 and 66 will be equally and oppositely excited and the y motor will be at standstill.

A three stage balanced amplifier 67, which is identical in all respects with the amplifier 56, is connected between the output terminals of amplifier 55 and the x motor. The speed and direction of rotation of the x motor are controlled in accordance with the magnitude of the control voltage $E_x$ which is supplied to the input terminals of amplifier 67.

A three stage balanced amplifier 69, which is identical in all respects with the amplifiers 56 and 67, amplifies a direct signal voltage which is a measure of the total current conducted by both thyratrons 38 and 39 and supplies the "angle" motor 43 to maintain the arm 15 perpendicular to the curved line. The signal voltage is obtained from the voltage drop across the resistor 70 which is connected in the cathode circuit of both thyratrons 38 and 39 and through which the total current flows. When this signal voltage is maximum the motor 43 rotates at full speed in one direction and when the signal voltage is zero, the motor 43 runs at full speed in the reverse direction. At the value of signal voltage that appears across the resistor 70 when the arm 15 is perpendicular to the curve line, the motor 43 is at standstill.

With the foregoing understanding of the elements and their organization in the complete control system, the operation of the system itself will readily be understood from the following detailed description.

If it is desired that the cut taken by the cutter 7 shall be the same size as the curve 2, the scanning head 14 is adjusted to a position on the arm 15 such that the distance between the optical axis and the axis of rotation of the spindle 16 is equal to the radius of the cutter. The size of the cut taken may be increased or decreased with respect to the curve 2 by adjusting the scanning head to a position further from or closer to the spindle 16. It is assumed in the following description that the distance from the optical axis to the axis of rotation of the spindle 16 is equal to the radius of the cutter.

Further to explain the operation, it is assumed that a line 71 is being traced which has a portion that is straight and horizontal and a portion at the right hand extremity which curves downwardly, as illustrated in Fig. 6. It is further assumed that the scanning head is properly centered and oriented with respect to the line. In other words, the line 71 will be centered under the lens barrel, as indicated in Fig. 3A. The impulses 42a, 42b, etc. occur exactly in phase with the anode voltages of thyratrons 38 and 39, i. e. the maximum values of the impulses and the anode voltages coincide in time. Consequently both thyratrons conduct equal amounts of current, and in this case the inductance bridge is balanced and zero voltage is supplied to the Selsyn winding 45a and zero voltage is induced in the secondary winding 45c. It is to be noted that the relative positions of the rotor and stator are such that maximum coupling exists between windings 45a and 45c and between windings 45b and 45d, whereas zero coupling exists between windings 45a and 45d and between windings 45b and 45c. Since zero voltage is supplied to the input circuit of the phase sensitive amplifier, the y motor is at standstill.

On the other hand, the constant magnitude alternating voltage supplied to Selsyn primary winding 45b will induce a voltage only in secondary winding 45d which in turn will produce at the output terminals of phase sensitive amplifier 55 a direct voltage $E_x$ of maximum value. This voltage $E_x$ of maximum value causes the $x$ motor to operate at maximum speed, and to drive the scanning head to the right along the line 71.

If the scanning head should become displaced slightly to one side of the line 71, one of the thyratrons, e. g. the thyratron 39, will conduct more current than the thyratron 38. This is the condition illustrated in Fig. 3B. This unbalances the inductance bridge and causes a voltage to be applied to the Selsyn primary winding 45a which induces a voltage in the secondary winding 45c. This voltage is supplied to the amplifier and causes the $y$ motor to rotate in a direction to restore the scanning head to a position in which the line 71 is centered in the lens barrel. Similarly, if the scanning head becomes slightly displaced to a position on the opposite side of the line, the thyratron 38 will conduct more current than the thyratron 39. This unbalances the bridge in the opposite sense and causes a voltage of reverse phase to be applied to the Selsyn primary winding 45a and likewise a voltage of reverse phase is induced in the Selsyn secondary winding 45c. As a result, the voltage $E_y$ is decreased to such a value that the $y$ motor rotates in the reverse direction to restore the scanning head to its correct position with the line 71 centered in the lens barrel.

If the arm 15 is not perpendicular to the line 71, the impulses from the photoelectric cell are either phase advanced or phase retarded with respect to the anode voltages of thyratrons 38 and 39. If the departure of arm 15 from perpendicularity with respect to the line is in such a direction as to advance the phase of the impulses 42a, 42b, etc., the total current conducted by both thyratrons increases above the normal total value that the thyratrons conduct when the arm is perpendicular to the line. This condition is illustrated in Fig. 3C. This produces an increase in the voltage drop across resistor 70 and as a result the angle motor 43 is energized for rotation in a direction to restore the arm to a perpendicular position with respect to the line. Similarly, if the departure of the arm from perpendicularity is in the opposite direction, the voltage impulses 42a, 42b will be phase retarded with respect to the anode voltages, and the total current conducted by both thyratrons will decrease below the normal total value. Likewise the voltage drop across resistor 70 will decrease below the normal value and the angle motor 43 will rotate in the reverse direction to restore the arm 15 to its correct perpendicular position. The angle motor 43 in rotating the arm in a direction to restore it to the perpendicular position rotates the stator member of the scanning head motor 18a, 18b which carries with it the motor rotor member dove prism and the aperture. Since the image of the line is rotated by rotation of the dove prism an angular amount equal to twice the angle of rotation of the prism, a rotation of the prism through only half of the error angle would produce an indication that full correction had been made were it not for the simultaneous rotation of the aperture. The aperture being mounted on the stator member 14 rotates with it and therefore the image of the line rotates with respect to the aperture causing the proper phase connection of the voltage impulses 42a and 42b only when the full angular correction of the arm has been made.

As the scanning head continues along the line 71, it approaches the curved portion of the line. Only the $x$ motor is in operation since it is assumed that no errors exist. As the scanning head reaches the curved portion of the line, errors will immediately develop, as shown in an exaggerated form in Fig. 6. Consequently the $y$ motor will be energized simultaneously with the $x$ motor. Each motor will produce a component of motion and the scanning head will be returned along a resultant path of motion to its correct position on the line. This resultant path is indicated by a dotted line in Fig. 6. When the scanning head reaches the curve the arm 15 is no longer perpendicular to the line, and consequently the angle motor 43 is energized to rotate the arm 15 in a clockwise direction to restore it to perpendicularity. In rotating the arm, the motor 43 also rotates the rotor of the Selsyn 45 in a clockwise direction, as viewed in Fig. 4. As a result the coupling between Selsyn primary winding 45b and 45c is increased from zero to a value corresponding to the amount of rotation of the Selsyn rotor, and the coupling between primary winding 45b and 45c will be correspondingly decreased. Thus in continuing the motion along the curved line after the scanning head has been brought back to the line at the point 71a, control voltages are supplied from both secondary windings 45c and 45d to the amplifier for the $x$ motor and the $y$ motor, and both motors are simultaneously energized so that each produces a component of motion to cause the scanning head to move along a path which is the resultant of both components.

If the slope of the portion of the curve beyond the point 71a should be 45° with respect to the horizontal portion of the line, the motor 43 in bringing the arm 15 to a position of perpendicularity would rotate the Selsyn rotor through an angle of 45°. Thus there would be an angle of 45° between the axis of Selsyn primary winding 45b and the axis of each of the secondary windings 45c and 45d. This would result in both the $x$ motor and the $y$ motor running at equal speeds, and the scanning head would move in a resultant direction at 45° to the horizontal.

Similarly if the portion of the curve beyond the point 71a should be perpendicular to the horizontal position, the motor 43 in rotating the arm 15 90° to a position of perpendicularity would also have rotated the Selsyn rotor 90°. In this case the coupling between primary winding 45b and secondary winding 45c would be maximum and the coupling between winding 45a and 45c would be zero. Consequently the $y$ motor would operate at maximum speed and the $x$ motor would be at standstill. The $y$ motor would thus drive the scanning head in a direction perpendicular to the horizontal portion of the line.

This operation continues as the curvature progresses through 360°, thereby enabling the system to cause the scanning head to follow around a completely closed curve, such as the curve 2.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A curve follower comprising in combination, a source of reference alternating voltage, a pair of electric valves each having an anode, a cathode, and a control grid, said valves having their anodes supplied from said source in phase opposition, means for supporting a surface having a curved line thereon, a photoelectric scanning device having an optical axis intersecting said surface and responsive to intersection of said axis and said line for producing and supplying to said grids signal voltage impulses in phase with said anode voltages and responsive to intersection of said axis and said surface on one side of said line for supplying to one of said grids phase advanced voltage impulses and to the other of said grids phase retarded voltage impulses to effect unequal conduction of said valves, and driving means responsive to equal conduction of said valves for producing zero component of relative movement of said support and said scanning device in a direction perpendicular to said line and responsive to unequal conduction of said valves for effecting relative movement of said support and said scanning device in a direction to restore the condition of intersection of said axis and said curved line.

2. A curve follower comprising in combination, a source of reference alternating voltage, a pair of electric valves each having an anode, a cathode and a control grid, said valves having their anodes supplied from said source in phase opposition, means for supporting a surface having a curved line thereon, means defining an axis of rotation perpendicular to said surface, an arm mounted for rotation about said axis, a photoelectric scanning device mounted on said arm for rotation about said axis and having an optical axis intersecting said surface, said scanning device being responsive to perpendicularity between said curved line and a line joining the intersections of said axes with said surface for producing and supplying to said grids signal voltage impulses in phase with said anode voltages to effect equal conduction of said valves of a predetermined value and responsive to nonperpendicular relationship of said lines for supplying dephased signal voltage impulses to said grids to vary the total conduction of said valves, and driving means motionless in response to said predetermined amount of conduction and responsive to an amount of conduction different from said predetermined value for rotating said arm about said axis of rotation to restore said perpendicular relationship.

3. A curve follower comprising in combination, means for supporting a surface having a curved line thereon, a rotary transformer having a rotor member, a stator member, a pair of primary windings arranged in quadrature on one of said members, and a pair of secondary windings arranged in quadrature on the other of said members, means defining an axis of rotation perpendicular to said surface, an arm mounted for rotation about said axis, a photoelectric scanning device mounted on said arm for rotation about said axis and having an optical axis intersecting said surface and responsive to the condition of perpendicularity between said curved line and a line joining the intersections of said axes for controlling the relative energizations of said primary windings, a first reversible driving means controlled by the voltage of one of said secondary windings for effecting relative movement of said support and said scanning device in a first direction or in reverse, a second reversible driving means for effecting relative movement of said support and said driving means in a direction perpendicular to said first direction, a third reversible driving means controlled by said scanning device in response to a departure from the perpendicular relationship of said lines for restoring said perpendicular relationship and for simultaneously rotating said rotor member to effect relative rotation of said primary and secondary windings to vary the relative speeds of said first and second driving means.

4. A curve follower comprising in combination, means for supporting a surface having a curved line thereon, a rotary transformer having a rotor member, a stator member, a pair of primary windings arranged in quadrature on one of said members, and a pair of secondary windings arranged in quadrature on the other of said members, means defining an axis of rotation perpendicular to said surface, an arm mounted for rotation about said axis, a photoelectric scanning device having an optical axis perpendicular to said surface, a first reversible driving means controlled by the voltage of one of said secondary windings for effecting relative movement of said support and said scanning device in a first direction or in reverse, a second reversible driving means controlled by the voltage of the other of said secondary windings for effecting relative movement of said support and said scanning device in a direction perpendicular to said first direction or in reverse, means for supplying a control alternating voltage to one of said primary windings to control the relative energizations of said driving means to effect relative motion of said support and scanning device in a direction tangent to said curved line, electric valve means controlled by said scanning device in response to intersection of said optical axis and said surface on one side of said curved line for effecting a supply of alternating voltage to the other of said primary windings to control the relative energizations of said driving means to effect relative motion of said support and scanning device in a direction perpendicular to said curved line, and a third reversible driving means controlled by said electric valve means in response to a departure from a perpendicular relationship of said curved line and a line joining the intersection of said axes with said surface for rotating said arm to restore said perpendicular relationship and for simultaneously rotating said rotor member to vary the relative speeds and directions of said first and second driving means to maintain a relative motion of said support and said scanning device tangent to said curved line.

5. A curve follower comprising in combination, a source of reference alternating voltage, a pair of electric valves each having an anode, a cathode, and a control grid, said valves having their anodes supplied from said source in phase opposition, means for supporting a surface having a curved line thereon, a photoelectric scanning device having an optical axis intersecting said surface and responsive to intersection of said axis and said line for producing and supplying to said grids signal voltage impulses in phase with said anode voltages and responsive to intersection of said optical axis with said surface on one side of said line for supplying to the grid of a first of said valves phase advanced voltage impulses and to the grid of the second valve phase retarded voltage impulses to effect increased conduction by said first valve and decreased conduction by said second valve, said scanning device being responsive to intersection of said optical axis with said surface on the other side of said line for supplying to the grid of said first valve phase retarded voltage impulses and to the grid of said second valve phase advanced voltage impulses to decrease the conduction of said first valve and to increase the conduction of said second valve, a first driving motor for producing a component of relative motion of said support and scanning device and a second motor for producing a second component of relative motion of said support and scanning device at right angles to said first component, said motors being controlled by said valves and being responsive to the condition of increased conduction of said first valve and decreased conduction of said second valve for effecting relative motion of said support and said scanning device in a direction perpendicular to said curved line to restore the condition of intersection of said axis with said curved line, and responsive to the condition of decreased conduction of said first valve and increased conduction of said second valve for effecting relative motion of said scanning device and surface in the opposite direction to restore the condition of intersection of said line and said axis.

6. A curve follower comprising in combination, a source of reference alternating voltage, a pair of electric valves each having an anode, a cathode, and a control grid, said valves having their anodes supplied from said source in phase opposition, means for supporting a surface having a curved line thereon, a scanning device comprising a lens system having an optical axis perpendicular to said surface, a supporting means for said lens system, a member mounted on said supporting means displaced along said axis from said lens system and provided with a light transmitting aperture offset with respect to said axis, a photoelectric cell mounted to receive light transmitted through said aperture, a prism rotatably mounted between said lens system and said aperture for rotation about said axis as a center, a synchronous motor supplied from said source for rotating said prism to rotate the image of a portion of said curved line past said aperture once for each half cycle of said voltage to cause said photoelectric cell to supply in-phase voltage impulses to said grids when said optical axis intersects said curved line and to supply a phase advanced voltage to one of said grids and a phase retarded voltage to the other of said grids to effect unequal conduction of said valves in response to intersection of said axis with said surface on one side of said line, and driving means responsive to equal conduction of said valves for producing zero component of relative movement of said support and said scanning device in a direction perpendicular to said line and responsive to unequal conduction of said valves for effecting relative movement of said support and said scanning device in a direction to restore the condition of intersection of said axis and said curved line.

7. A curve follower comprising in combination, a source of reference alternating voltage, a pair of electric valves each having an anode, a cathode and a control grid, said valves having their anodes supplied from said source in phase opposition, means for supporting a surface having a curved line thereon, means defining an axis of rotation perpendicular to said surface, an arm mounted for rotation about said axis, a scanning device mounted on said arm at a predetermined distance from said axis and comprising a lens system having an optical axis perpendicular to said surface, a tubular member mounted on said arm for supporting said lens system at one end thereof, a disc member closing the opposite end of said tubular member and provided with a light transmitting aperture offset with respect to said axis, a photoelectric cell mounted to receive light transmitted through said aperture, a prism rotatably mounted between said lens system and said aperture for rotation about said axis as a center, a synchronous motor supplied from said source for rotating said prism to rotate the image of a portion of said curved line past said aperture once during each half cycle of said voltage to cause said photoelectric cell to supply to said grids voltage impulses in phase with said anode voltages to effect a predetermined total conduction of said valves in response to perpendicularity between said curved line and a line joining the intersection of said axes with said surface and responsive to nonperpendicular relationship of said lines for supplying dephased voltage impulses to said grids to vary the total conduction of said valves, and an electric motor inactive in response to said predetermined total conduction of said valves and responsive to a total conduction different from said predetermined amount for rotating said arm about said axis of rotation to restore said perpendicular relationship.

8. A curve follower comprising in combination, a source of reference alternating voltage, a pair of electric valves each having an anode, a cathode and a control grid, said valves having their anodes supplied from said source in phase opposition, means for supporting a surface having a curved line thereon, a rotary transformer having a rotor member, a stator member, a pair of primary windings arranged in quadature on one of said members, a pair of secondary windings arranged in quadrature on the other of said members, means defining an axis of rotation perpendicular to said surface, an arm mounted for rotation about said axis, a photoelectric scanning device having an optical axis perpendicular to said surface, a first reversible electric motor controlled by the voltage of one of said secondary windings for effecting relative movement of said support and said scanning device in a first direction or in reverse, a second reversible electric motor controlled by the voltage of the other of said secondary windings for effecting relative movement of said support and said scanning device in a direction perpendicular to said first direction or in reverse, means for supplying a control alternating voltage to one of said primary windings to control the energizations of said motors to effect a component of relative motion of said support and scanning device in a direction tangent to said curved line, an inductance bridge controlled by said electric valves in response to intersection of said optical axis and said surface on one side of said curved line for supplying to the other of said primary windings a control alternating voltage to control the energizations of said motors to effect a component of relative motion of said support and said scanning device in a direction perpendicular to said curved line, and a third reversible electric motor controlled by the total current conducted by both said valves in response to a departure from a perpendicular relationship of said curved line and a line joining the intersection of said axes with said surface for rotating said arm to restore said perpendicular relationship and for simultaneously rotating said rotor member to vary the relative speeds and directions of said first and second motors to maintain relative motion of said support and said scanning device as the following operation progresses along said curved line.

THEODORE M. BERRY.
HOWARD L. CLARK.

REFERENCES CITED

The following references are of record in the file of this patent:

UNITED STATES PATENTS

| Number | Name | Date |
|---|---|---|
| 2,261,644 | Cockrell | Nov. 4, 1941 |
| 2,397,933 | Fowle et al. | Apr. 9, 1946 |

Certificate of Correction

Patent No. 2,499,178 February 28, 1950

THEODORE M. BERRY ET AL.

It is hereby certified that errors appear in the printed specification of the above numbered patent requiring correction as follows:

Column 5, line 65, beginning with "However, if the" strike out all to and including the word and period "thyratrons." in line 71, same column; column 10, line 52, for "position" read *portion*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*